United States Patent [19]
Roberts

[11] Patent Number: 5,720,526
[45] Date of Patent: Feb. 24, 1998

[54] LOCKING MECHANISM AND METHOD FOR A TILTABLE TRUCK BED

[76] Inventor: Donald D. Roberts, 720 Pine St., Auburndale, Fla. 33823

[21] Appl. No.: 635,297

[22] Filed: Apr. 19, 1996

[51] Int. Cl.⁶ ............................................. B60P 1/16
[52] U.S. Cl. ........................ 298/22 C; 298/14; 414/477
[58] Field of Search ............................ 298/12, 22 C; 414/477, 478, 479, 480, 484, 485, 522, 563

[56] References Cited

U.S. PATENT DOCUMENTS

| | | | |
|---|---|---|---|
| 4,508,388 | 4/1985 | Minami | 298/22 C |
| 4,756,658 | 7/1988 | Moore et al. | 414/477 |
| 4,758,128 | 7/1988 | Law | 414/477 |
| 5,006,033 | 4/1991 | McConnell | 298/22 C X |
| 5,065,569 | 11/1991 | Schlueter | 298/22 C X |
| 5,249,909 | 10/1993 | Roberts et al. | 414/477 X |

Primary Examiner—Janice L. Krizek
Attorney, Agent, or Firm—Allen, Dyer, Doppelt, Milbrath & Gilchrist, P.A.

[57] ABSTRACT

A device and method for locking a slidable and tiltable truck bed against tilting when the truck bed is in the forward position adjacent the truck cab are presented. The device includes a movable actuator that communicates with the truck's hydraulic system to effect tilting. If this actuator is prevented from moving, the tilting function cannot be accessed. The actuator is locked by restraining its top end between two tabs at one end of a hinge. A spring positioned between a fixed support, to which is also affixed the other end of the hinge, and one of the tabs, in the absence of compression, permits the actuator free motion; upon a forward sliding of the truck bed, however, the spring is compressed, moving the tabs downward to engage and restrain the actuator top end.

3 Claims, 6 Drawing Sheets

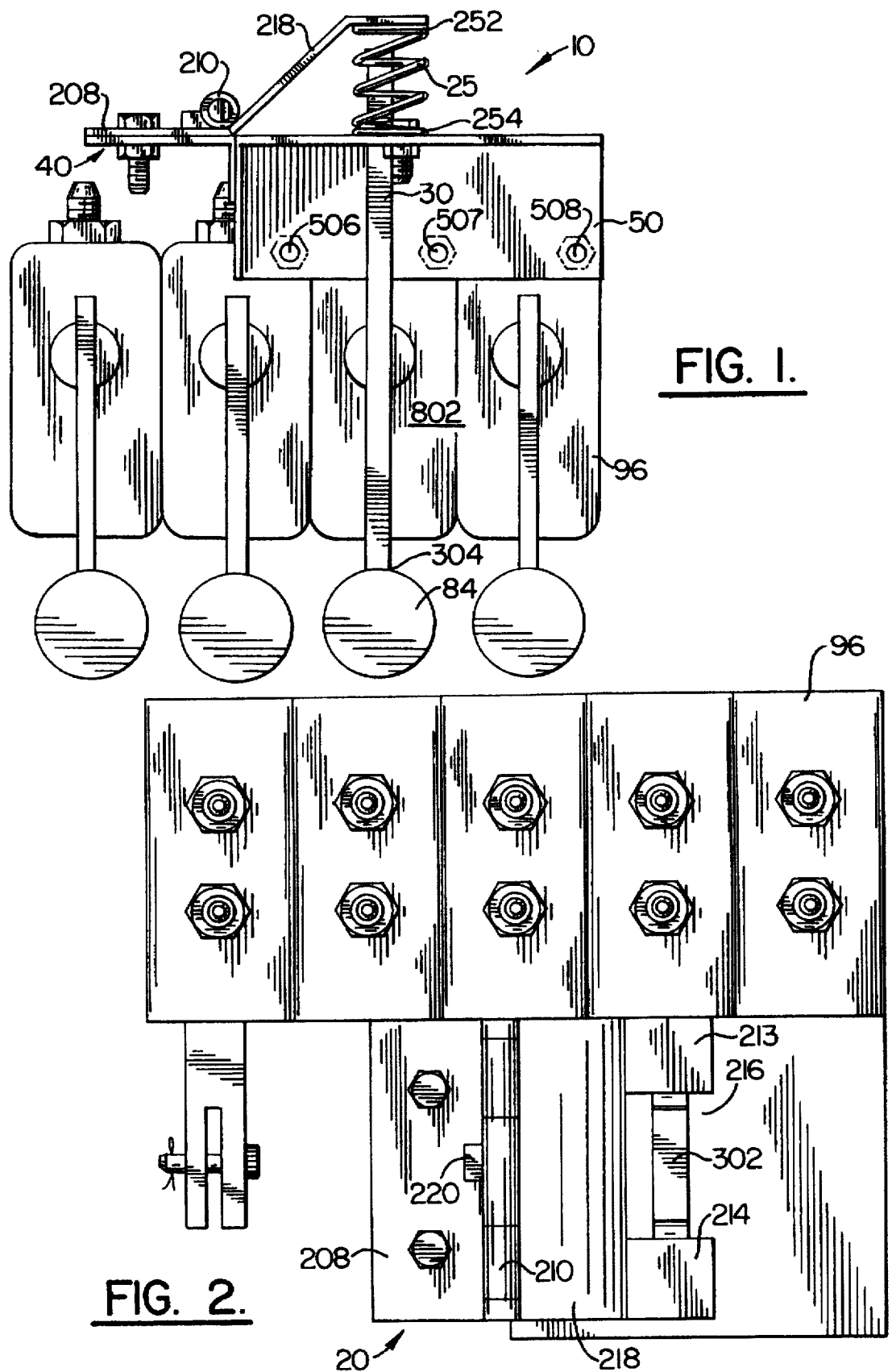

1

LOCKING MECHANISM AND METHOD FOR A TILTABLE TRUCK BED

BACKGROUND OF THE INVENTION

1. Field of the Invention

The present invention relates to vehicles having sliding and tilting beds, and, more particularly, to mechanisms for preventing a tilting movement when the bed is in a forward position.

2. Description of Related Art

Trucks that have a bed that slides and tilts relative to the truck frame are used in a number of applications, such as for carrying vehicles and as dump trucks.

Typically such trucks are constructed so that the tilting motion is intended to occur after the bed has been moved rearward of the cab; if tilting precedes sliding, damage can occur to the truck structure and bed locking device at the forward end of the frame adjacent the cab.

This problem has been addressed previously by Moore et al. (U.S. Pat. No. 4,756,658) using a cam plate and a stop plate for disabling the tilting function.

SUMMARY OF THE INVENTION

It is therefore an object of the present invention to provide a device and method for locking a truck bed against tilting when in a forward position.

It is an additional object to provide such a device and method for locking the truck bed by preventing an actuation of the truck's hydraulic system.

It is another object to provide such a device and method that is mechanically secure and durable over time and under heavy usage.

These objects and others are achieved with the device of the present invention, which is for locking a slidable and tiltable truck bed against tilting when the truck bed is in a forward position relative to a cab of the truck. The device comprises actuating means that are in communication with the truck's tilting mechanism. The actuating means are movable between a first position wherein the tilting mechanism is actuated and a second position wherein the tilting mechanism is not actuated. Typically the tilting mechanism is a hydraulic system for lifting the forward end of the truck bed relative to the truck frame.

The device also comprises locking means that is affixed to the truck frame. The locking means is movable between a first position disengaged from the actuating means and a second position in blocking relation to the actuating means. In the case of a hydraulic tilting mechanism, this entails preventing a linkage between a control knob and the hydraulic system from moving.

In a preferred embodiment of the device of the present invention, the actuating means, which is positioned beneath the truck bed, comprises an elongated member that is in mechanical communication along a generally central portion with a hydraulic tilting mechanism of the truck. In this embodiment the locking means comprises means for restraining a movement of the elongated member's top end.

The method of the present invention comprises providing actuating means that are in communication with a tilting mechanism of the truck. As above, the actuating means are movable between a first position wherein the tilting mechanism is actuated and a second position wherein the tilting mechanism is not actuated. The actuating means comprises an elongated member that is in mechanical communication along a generally central portion with a hydraulic tilting mechanism of the truck.

The method further comprises locking the actuating means in the second position when the truck bed is in the forward position by restraining a top end of the elongated member against movement to the first position.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a side view of the truck bed locking device in the first position.

FIG. 2 is a top plan view of the truck bed locking device.

DETAILED DESCRIPTION OF THE PREFERRED EMBODIMENTS

Figure 3A:
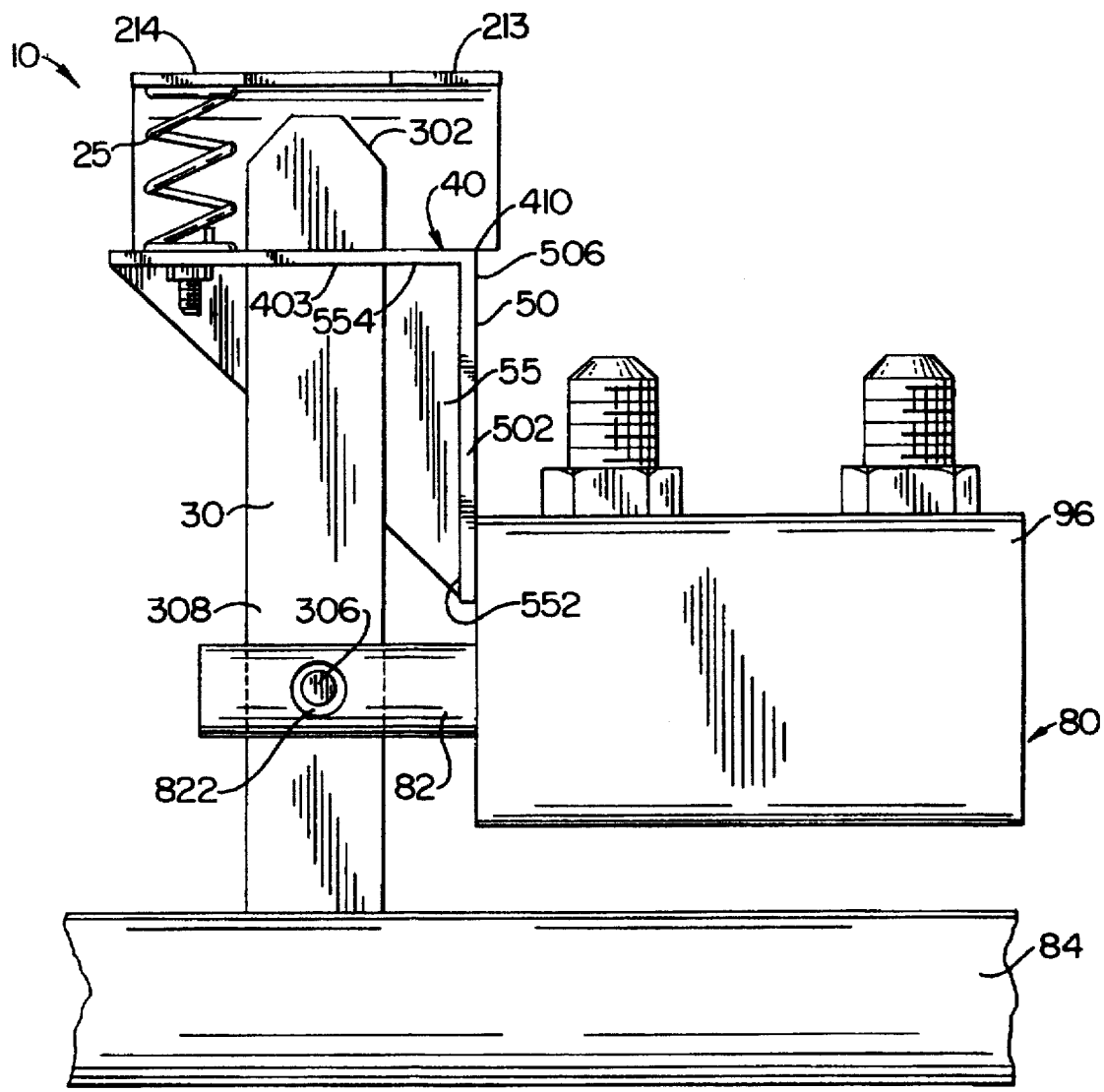
FIG. 3 is an end view of the truck bed locking device with the locking means (a) in the actuating position and (b) in the restrained position; and (c) with the elongated member positioned to effect tilting.

A description of the preferred embodiments of the present invention will now be presented with reference to FIGS. 1–7.

The assembled locking device 10 is illustrated in FIGS. 1–4 and is shown affixed to the truck 90 frame 94 (FIG. 7) via the first support plate 50, which is bolted vertically to the valve body 96 through holes 506–508. Right-angle gusset 55 is welded along its outer edge 552 to the rear edge 502 of the first support plate 50.

Figure 6:
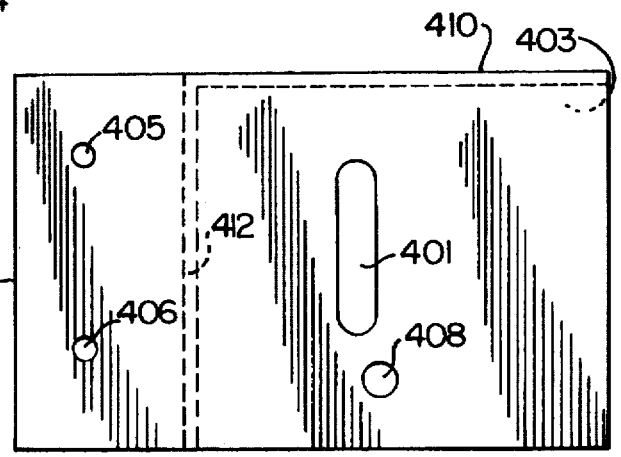
FIG. 6 is a top plan view of the second support plate.
Figure 7:
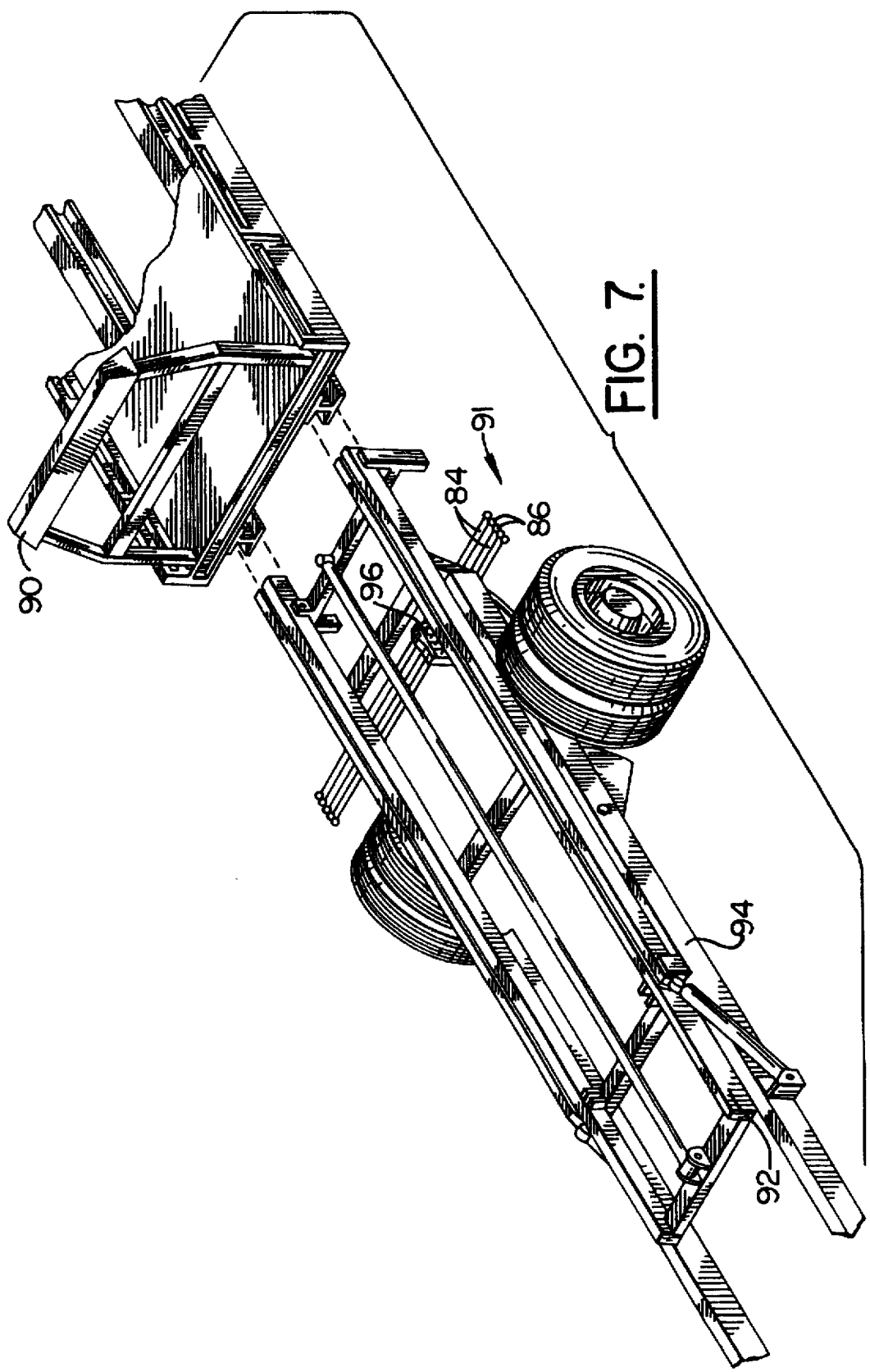
FIG. 7 is a side rear perspective view of the bed locking device installed upon the truck frame.

Second support plate 40, which is shown in detail in FIG. 6, is welded in a generally horizontal orientation along its outer edge 410 to the first support plate's top edge 506. Second support plate 40 has two bolt holes 405, 406 adjacent the rear edge 402 and further has an elongated slot 401 having its long axis in the lateral direction. A third bolt hole 408 is positioned inward and slightly forward of the elongated slot 401. Gusset 55 is welded along its top edge 554 to the bottom surface 403 of the second support plate 40 along a lateral section 412 (shown with a dotted line in FIG. 6) between the first and second bolt holes 405, 406 and the elongated slot 401.

An elongated member 30, which serves as the means for actuating the tilting mechanism, has a beveled top end 302 and a bottom end 304 connected via a rod 84 to a control knob 86 operable by the user to effect a tilting of the truck bed 92 via a hydraulic system 80 that comprises a valve body 96 comprising a hydraulic valve 802 for actuating the tilting mechanism. From the hydraulic system 80 extends a movable arm 82 (a "selector") that, when pulled in a forward direction relative to the truck 90, activates the tilting mechanism (going from the configuration shown in FIG. 3a to that in FIG. 3c). Arm 82 is affixed along a generally central portion 308 via cooperating holes 822 and 306 through which a pin is affixed. Thus it can be seen that restraining elongated member 30 from moving arm 82 laterally will prevent the tilting mechanism 80 from being activated.

This restraining is accomplished by the action of a cooperating hinge 20 and spring 25. The hinge 20, which is shown in detail in FIG. 5, has a rear section 208 that is affixed to the truck frame 94, specifically, by being bolted through holes 205, 206 adjacent the hinge's rear edge 202. A hinge section 210 is forward of and protrudes above the rear section 208, with pin 211 holding the hinge parts together.

A ramp section 218 is forward of the hinge section 210 and is pivotable about the rear section 208 via the action of the hinge section 210. Welded to the forward edge of the ramp section 218 at an oblique angle, approximately 160 degrees, are outer 213 and inner 214 tabs, which form the forward section of the hinge 20. The facing edges of tabs 213, 214 form a cutout 216 that is dimensioned to closely engage the elongated member top end 302 when positioned in surrounding relation thereto.

Affixed to hinge section 210 is restraining tab 220, which prevents the angle between the hinge section 210 and the ramp section 218 from becoming acute; that is, restraining tab 220 prevents the ramp section 218 from folding over atop the hinge section 210.

Spring 25 is positioned so that its top end 252 is beneath the inner tab 214 so as not to obscure from below the cutout 216. The spring's bottom end 254 is bolted to the truck frame 94 via third hole 408 in the second support plate 40.

Figure 4:
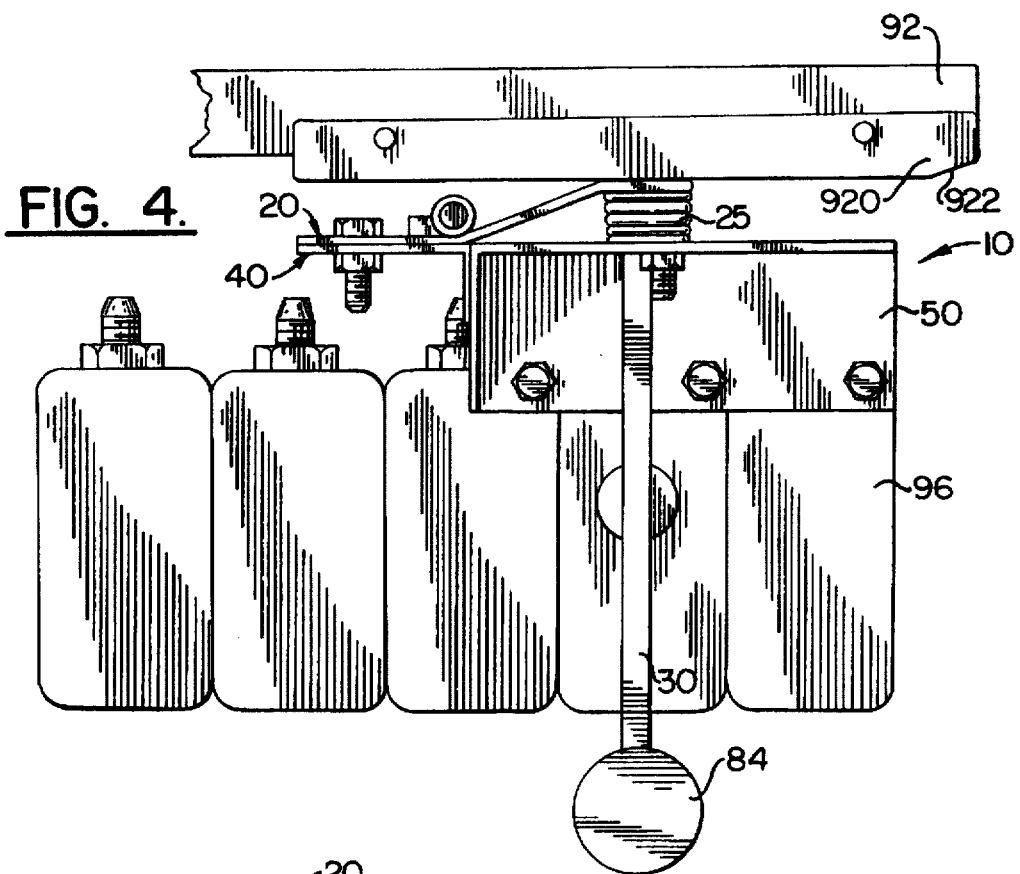
FIG. 4 is a side view of the truck bed locking device with the truck bed in the forward position, the locking device in position to restrain the tilting mechanism.
Figure 5:
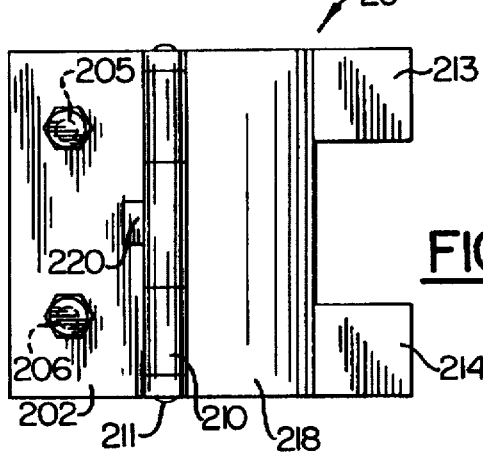
FIG. 5 is a top plan view of the hinge.

In order to assist in achieving a smooth sliding motion, a downwardly depending member 920 is affixed to a portion of the truck bed 92 that is rearward of the device 10 when the bed 92 is in the rearward position and is atop the device 10 when the bed 92 is in the forward position (FIG. 4). Bed member 920 has a ramped portion 922 along its forward edge to ease cooperation between the bed member 920 and the hinge 20.

Figure 3B:
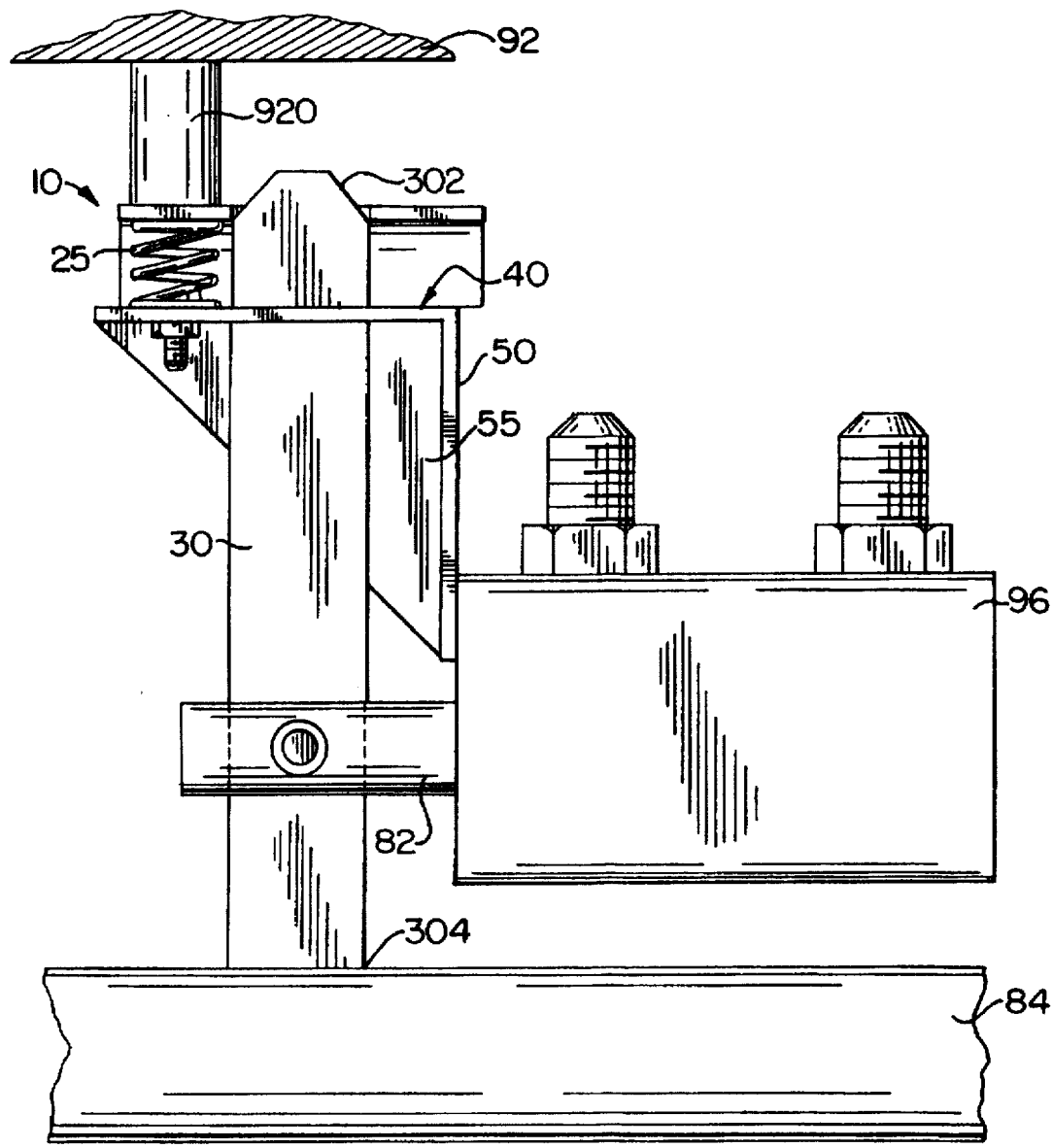
Figure 3C:
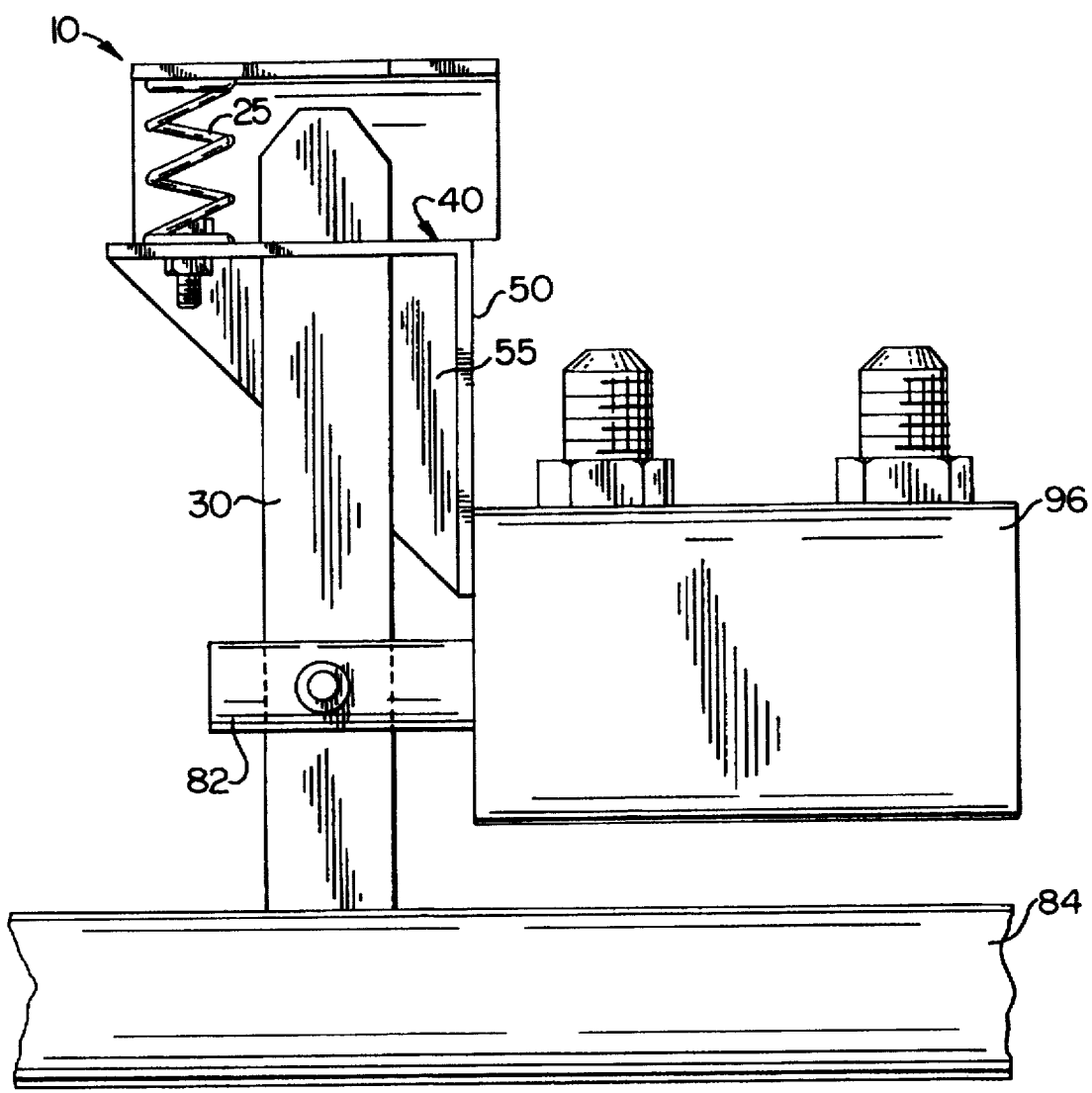

In use, then, as shown in FIGS. 1 and 3a versus FIGS. 4 and 3b, when the bed 92 slides from the rearward to the forward position, the ramp 922 engages the hinge ramp section 218, causing the spring 25 to compress and lowering the hinge tabs 213, 214 and ramp section 218 to the second position, wherein the elongated member top end 302 is restrained within the hinge cutout 216.

It can be seen that the locking device 10 of the present invention, and the method of its operation, represent a distinct improvement over previous efforts. The device 10 is a mechanically tight system, with both sides of the elongated member 30 restrained from moving by the hinge tabs 213, 214. This restraint is unlikely to degrade over time nor lose effectiveness through normal wear and tear.

In addition, the present system is advantageous because of the tight coupling between the valve body 96 and locking device 10, which is achieved by placing the valve body 96 near the center of the truck frame 94 and close to the operator controls 91. Therefore, there is no intermediate linkage to the valve body 96.

It may be appreciated by one skilled in the art that additional embodiments may be contemplated, including similar mechanisms and methods for restraining an actuator from effecting movement of relatively movable elements.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A device for locking a slidable and tiltable truck bed against tilting when the truck bed is in a forward position relative to a cab of the truck, the device comprising:

actuating means in communication with a tilting mechanism of the truck movable between a first position wherein the tilting mechanism is actuated and a second position wherein the tilting mechanism is not actuated, the actuating means having a protrusion and being rigidly mechanically linked with an operator control;

locking means affixed to a frame of the truck, the locking means having a cutout dimensioned to surround the protrusion and being movable between a first position wherein the cutout is disengaged from the actuating means protrusion and a second position in blocking relation to the actuating means, wherein the protrusion resides within the cutout, for restraining the actuating means in the locking means second position.

2. The device recited in claim 1, wherein:

the actuating means is positioned beneath the truck bed;

the actuating means comprises an elongated member in mechanical communication with a hydraulic tilting mechanism of the truck along a generally central portion between a top end and a bottom end of the elongated member; wherein the top end comprises the protrusion; and the locking means comprises means for restraining a movement of the top end of the elongated member.

3. A device for locking a slidable and tiltable truck bed against tilting when the truck bed is in a forward position relative to a cab of the truck, the device comprising:

actuating means positioned beneath the truck bed in communication with a tilting mechanism of the truck movable between a first position wherein the tilting mechanism is actuated and a second position wherein the tilting mechanism is not actuated, the actuating means comprising an elongated member in communication with a hydraulic tilting mechanism of the truck along a generally central portion between a top end and a bottom end of the elongated member;

locking means affixed to a frame of the truck movable between a first position disengaged from the actuating means and a second position in blocking relation to the top end of the elongated member for restraining the elongated member in the locking means second position, wherein the locking means comprises:

a hinge having:

a rear section affixed to the truck frame;

a hinge section forward of the rear section;

a ramp section forward of the hinge section; and a forward section having a cutout at a forward edge dimensioned and positioned to closely engage the elongated member top end when the locking means is in the second position, the forward section forming an oblique angle with the ramp section, the forward section further positioned forward of the truck bed when the truck bed is in a rearward position and beneath the truck bed when the truck bed is in the forward position;

a spring positioned beneath the hinge forward section and having a bottom end affixed to the truck frame;

wherein, when the truck bed slides from the rearward to the forward position, a downwardly depending portion of the truck bed engages the hinge ramp section, causing the spring to compress and lowering the hinge forward section to the locking means second position, wherein the elongated member top end is restrained within the hinge forward section cutout.

* * * * *